(12) United States Patent
Oksman et al.

(10) Patent No.: US 9,871,665 B2
(45) Date of Patent: Jan. 16, 2018

(54) POWER CONSUMPTION MANAGEMENT IN COMMUNICATION SYSTEM

(75) Inventors: Vladimir Oksman, Morganville, NJ (US); Joon-Bae Kim, Lexington, MA (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 64 days.

(21) Appl. No.: 13/479,244

(22) Filed: May 23, 2012

(65) Prior Publication Data
US 2013/0138982 A1    May 30, 2013

Related U.S. Application Data

(60) Provisional application No. 61/490,051, filed on May 25, 2011.

(51) Int. Cl.
| | | |
|---|---|---|
| *H04L 12/02* | (2006.01) | |
| *H04B 3/54* | (2006.01) | |
| *H04L 12/12* | (2006.01) | |

(52) U.S. Cl.
CPC ............. *H04L 12/02* (2013.01); *H04B 3/544* (2013.01); *H04L 12/12* (2013.01); *Y02B 60/34* (2013.01)

(58) Field of Classification Search
None
See application file for complete search history.

(56) References Cited

U.S. PATENT DOCUMENTS

| | | | | |
|---|---|---|---|---|
| 2005/0063331 A1* | 3/2005 | Kim et al. | ................. | 370/328 |
| 2009/0063878 A1* | 3/2009 | Schmidt | ................ | G06F 1/3209 713/310 |
| 2009/0129306 A1 | 5/2009 | Twitchell et al. | | |
| 2009/0222680 A1* | 9/2009 | Hirai | ................. | G06F 1/3203 713/310 |
| 2010/0150042 A1* | 6/2010 | Oh et al. | ................. | 370/311 |
| 2010/0319037 A1* | 12/2010 | Kim et al. | ................. | 725/81 |
| 2011/0110305 A1* | 5/2011 | Wang et al. | ................. | 370/328 |

FOREIGN PATENT DOCUMENTS

| | | |
|---|---|---|
| CN | 101369948 A | 2/2009 |
| CN | 101494768 A | 7/2009 |
| CN | 101742544 A | 6/2010 |
| EP | 2114018 A1 | 11/2009 |
| WO | 2009/078575 A1 | 6/2009 |

OTHER PUBLICATIONS

"Magic Packet Technology." AMD. Nov. 1995. Publication# 20213, Rev: A, Amendment/0. Retrieved Dec. 23, 2014 <http://support.amd.com/TechDocs/20213.pdf>.*
Baran, P. (1990). Packet Switching. In J. C. McDonald (Ed.), Fundamentals of Digital Switching (2nd ed., Applications of Communication Theory, pp. 193-235). New York, NY: Springer Science+Business Media.*

* cited by examiner

*Primary Examiner* — Kim Huynh
*Assistant Examiner* — Joshua Neveln
(74) *Attorney, Agent, or Firm* — Eschweiler & Potashnik, LLC

(57) ABSTRACT

Representative implementations of devices and techniques provide an efficient communication that enables nodes in a reduced power consumption state to resume a regular power state (e.g., fully operational) or otherwise another power state (e.g., semi-operational) after processing the communication.

13 Claims, 6 Drawing Sheets

(FRAME - COMMUNICATION)

POWER CONSUMPTION MANAGEMENT IN COMMUNICATION SYSTEM

RELATED APPLICATIONS

This Application is a Non-Provisional Application of Provisional Application 61/490,051, which was filed on May 25, 2011. Priority of the Provisional Application is hereby claimed and the entire contents of the Provisional Application are incorporated herein by reference.

BACKGROUND

Power line Communication (PLC) is a communication technology that uses power lines as its communication medium. Data travels over the same power line that provides electricity, thus allowing the existing power line infrastructure in homes, businesses or cars to be used for the purpose of transporting data without adding new wires. PLC technology is experiencing a period of rapid growth and finding its way into multiple applications and market segments including smart grid, lighting control, solar panel monitoring, energy metering, in-home video distribution, and electric cars. The global push for energy conservation is driving the need for intelligently communicating with energy generation and energy consuming devices. PLC offers a unique no-new-infrastructure approach to enabling rapid deployment of smart energy management technology around the world. Unlike wireless solutions, PLC does not have limitations of line-of-sight and short transmission range. PLC is also a cost-effective and easy-to-install technology for many applications.

Communication technologies may be used with PLC to provide high speed data transmission. Such communication technologies include packet-based communication technologies, such as ITU G.hn, HomePNA, HomePlug® AV and Multimedia over Coax Alliance (MoCA). Such communication technologies typically employ either Carrier-less Amplitude and Phase (CAP) modulation or discrete multi-tone (DMT) modulation. CAP modulation is a variation of quadrature amplitude modulation (QAM). CAP modulation produces the same form of signal as QAM without requiring in-phase and quadrature carrier components. DMT modulation is a modulation method in which the available bandwidth of a communication channel is divided into numerous orthogonal sub-channels. Sub-channel is also referred to as sub-carrier or tone. Each tone of a DMT communication system is capable of acting as a communications sub-channel that carries information between a transmitter and a receiver. Multicarrier systems that make use of DMT modulation may also be referred to as systems that employ Orthogonal Frequency Division Multiplexing (OFDM). OFDM is also the modulation method employed by many wireless communication technologies, including ITU G.hn, HomePlug® AV, MoCA, IEEE 802.11 and IEEE 802.16 (WiMAX). Technologies implementing DMT, OFDM and other multicarrier modulation schemes are generalized herein as being multicarrier systems.

Multicarrier systems enable high data rates to be achieved over wireless and wireline networks, as data may be separated and simultaneously sent over separate sub-channels operating at different frequencies. While simultaneously transmitting over multiple sub-channels greatly improves data throughput, the modulation technique may increase the power consumption of the transmitter and receiver. Efficiently managing power consumption of communication devices has become increasingly important as the devices become smaller and efficiencies of such devices become vital.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of devices and techniques enable efficient power consumption management in a communication system. Successful communications in communication networks generally requires the detection of communicated packets of information. However, it is also advantageous for nodes to enable a reduced power consumption state during periods of inactivity. Such reduced power consumption states may generally include a sleep state (i.e., transmit and receive disabled), idle state (i.e., node is listening but not processing frames in the system 100), and a limited sleep state (i.e., node is listening and processing frames, but not transmitting). An embodiment according to one implementation provides an efficient communication that enables nodes in a reduced power consumption state to resume a regular power state (e.g., fully operational) or otherwise another power state (e.g., semi-operational) after processing the communication.

Various implementations, including techniques and devices, are discussed with reference to the figures. The techniques and devices discussed may be applied to any of various network designs, circuits, and devices and remain within the scope of the disclosure.

Implementations are explained in more detail below using a plurality of examples. Although various implementations and examples are discussed here and below, further implementations and examples may be possible by combining the features and elements of individual implementations and examples.

Example Communication System

Figure 1:
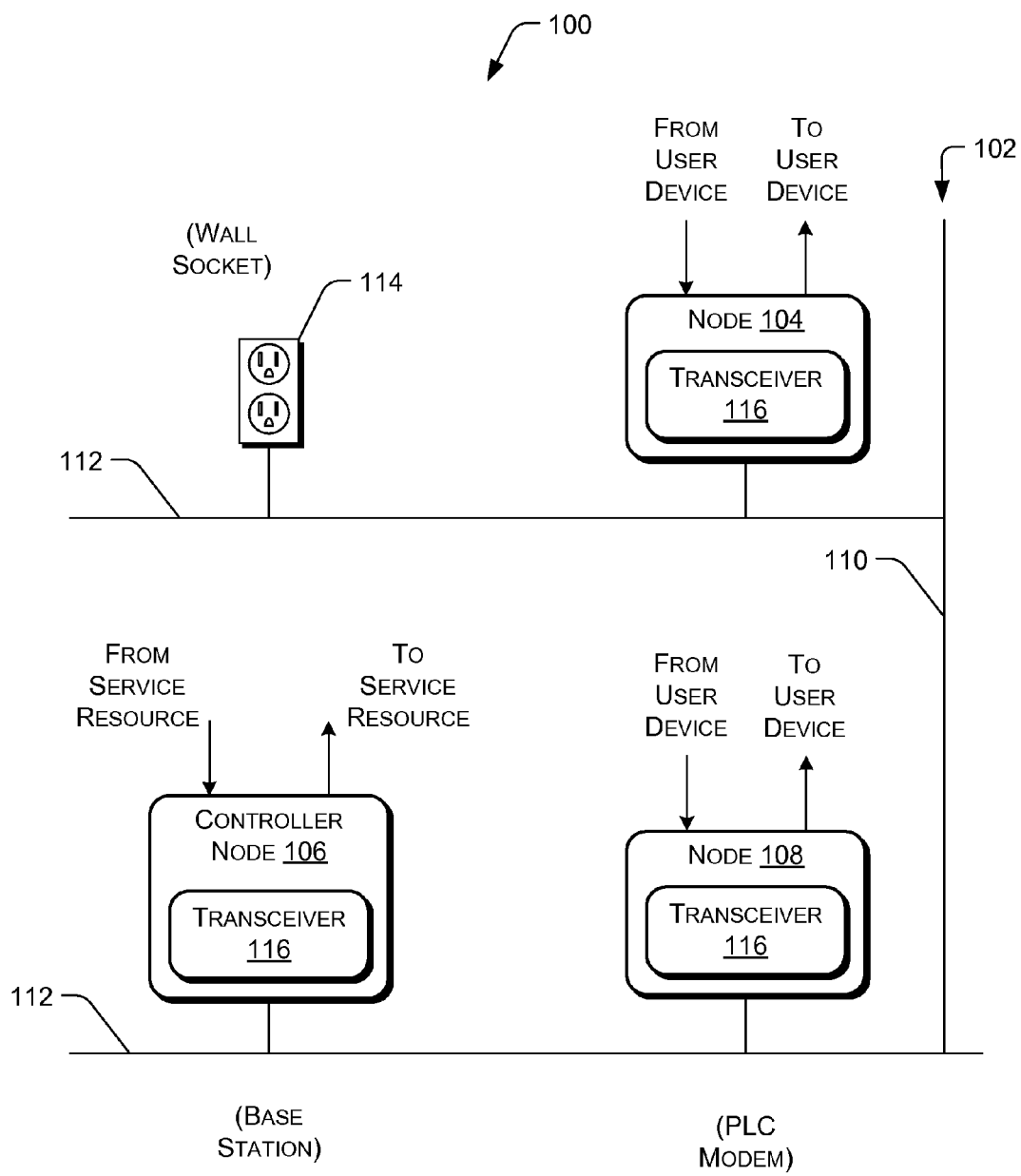
FIG. 1 is schematic of an example network or system in which the techniques in accordance with the present disclosure may be implemented.

In one implementation, as shown in FIG. 1, a system 100 comprises a communication network medium 102 shared by at least two nodes (e.g., nodes 104, 106, and 108) coupled to the medium 102. The nodes 104-108 are arranged to communicate at least in part via the medium 102. In one implementation, the system 100 is a multicarrier arrangement or system. In various alternate implementations, the system 100 based on the communication network medium 102 comprises a single communication channel and the nodes 104-108 represent discrete homogeneous networks communicatively coupled to the single communication channel.

The medium 102 may be comprised of a trunk or feeder 110 and one or more branches 112. In one example, the system 100 is a power line communication (PLC) system. In that case, the trunk 110 and branches 112 are electrical power distribution conductors (e.g., power lines) arranged to distribute electric power to one or more end user locations (e.g., within residences, commercial or professional suites, industrial sites, etc.). In the example, nodes 104-108 are coupled to the electric power lines and arranged to communicate at least in part via the electrical power lines. While the disclosure, including the figures and the discussion herein, discuss the techniques and devices disclosed in terms of a PLC system, the techniques and devices may be used for minimizing or eliminating neighbor network interference on other types of networks (e.g., wired and/or wireless, optical, etc.) without departing from the scope of the disclosure. For example, the medium 102 may be realized as a wireless communication medium, a wire line communication medium (e.g., coaxial cable, twisted pair of copper wires, power line wiring, optical fiber, etc.), or as combinations thereof.

As shown in FIG. 1, nodes 104-108 may be coupled to the medium 102 via one or more power outlets 114. For example, a node (104-108) may be "plugged in" to a wall socket (power outlet 114). Alternately, nodes 104-108 may be hardwired to the medium 102, or may be coupled in another manner allowing communication via the medium 102 (e.g., inductive coupling, optical coupling, wireless coupling, etc.).

As shown in FIG. 1, nodes 104-108 may also have connection to and/or from user devices, service resources, and the like. For example, a node (104-108) may be communicatively coupled to a user communications device, an automation console, a surveillance hub, a power usage monitoring and/or control interface, a service provider feed, a utility connection, and so forth. In one implementation, one or more of the nodes 104-108 is a controller node 106 (e.g., base station, master node, etc.) arranged to control communication of information with regard to the network. For example, a controller node 106 may receive an entertainment feed from a service provider, and distribute content to other nodes on the network (such as nodes 104 and 108) as well as optionally provide for content consumption at the controller node 106 itself. In one case, the controller node 106 may control the type of content that is distributed to the other nodes 104 and 108, control the bandwidth used by the other nodes 104 and 108, and/or provide other control functions.

In one implementation, one or more of the nodes 104-108 may include a multicarrier apparatus, transmitter, receiver, transceiver, modem, or the like, (generically referred to herein as a "transceiver 116") for communication via the network. Accordingly, the nodes 104-108 may include structure and functionality that enable signal communication over the medium 102. Such structure and functionality may include one or more antennas, integrated wire line interfaces, and the like. Depending on the implementation, the nodes 104-108 may communicate with one another directly (peer-to-peer mode) or the nodes 104-108 may communicate via the controller node 106. In one implementation, the nodes 104-108 are Orthogonal Frequency Division Multiplexing (OFDM) apparatuses capable of implementing the herein described implementations. For example, the nodes 104-108 may include a transceiver and/or a controller, as is discussed below.

In one implementation, system 100 may be a home network and one or more of the nodes 104-108 may be an access point of the home network. For example, in the implementation the controller node 106 may be a residential gateway that distributes broadband services to the other nodes (e.g., nodes 104 and 108). The nodes 104-108 may be associated with digital content destinations in the home, but may also be associated with digital content sources, such as digital video recorders (DVR), computers providing streaming video, televisions, entertainment centers, and the like.

Furthermore, the nodes 104-108 may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the nodes 104-108 may be enabled to communicate using IEEE 802.11 and IEEE 802.16 (Wi-MAX) wireless technologies.

Figure 2:
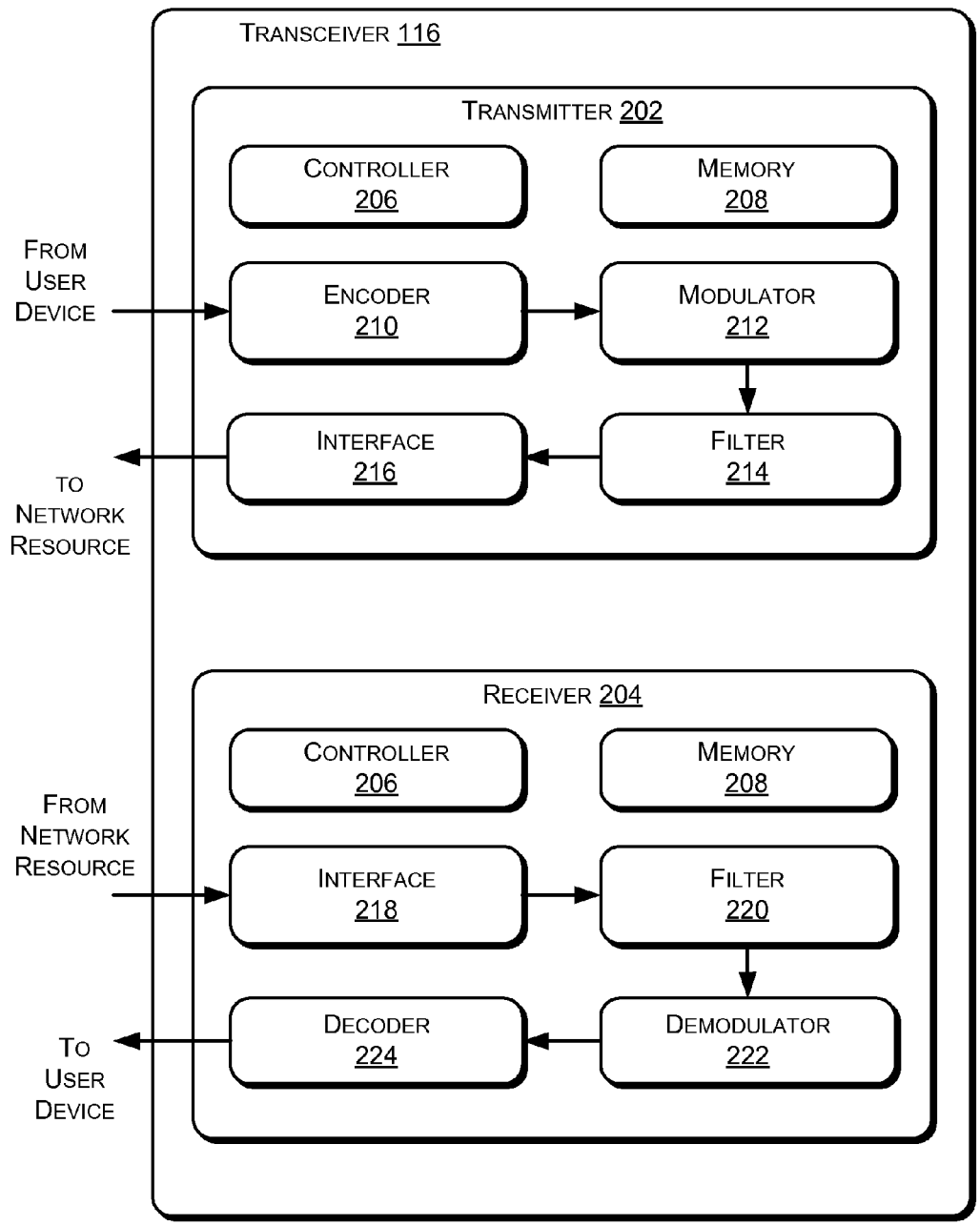
FIG. 2 is a block diagram illustrating one example of a node implemented as part of the network of FIG. 1.

In the example of FIG. 1, each of the nodes is shown having a transceiver 116. An example transceiver 116 is illustrated in FIG. 2. The transceiver 116 may include a transmitter portion 202 and/or a receiver portion 204, where one or both of the portions may include a controller 206 and/or memory 208. In various implementations, a single controller 206 may be shared by the transmitter 202 and the receiver 204. Likewise, in some implementations, a single memory 208 may be shared by the transmitter 202 and the receiver 204, or alternately the memory 208 may be comprised of multiple memory devices distributed in one or more of the transceiver 116, the transmitter 202, and the receiver 204.

As used herein, the term "controller 206" is meant generally to include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components. If included, the controller 206 may direct the flow of information through the transceiver 116, may provide timing to the components of the transceiver 116, may determine MAC cycle synchronization or alignment.

If included, the memory 208 may store executable instructions, software, firmware, operating systems, applications, preselected values and constants, and the like, to be executed or used by the controller 206, for example. In various implementations, the memory 208 may include computer-readable media. Computer-readable media may include, for example, computer storage media. Computer storage media, such as memory 208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the controller 206). Although the computer storage media (memory 208) is shown within the transceiver 116 it will be appreciated that the memory 208 may be distributed or located remotely and accessed via a network or other communication link.

As shown in FIG. 2, an example transmitter 202 may include an encoder 210, a modulator 212, a filter 216, and an interface 214. In alternate implementations, a transmitter 202 may include fewer components, alternate components, or additional components and remain within the scope of the disclosure.

In an implementation, signals exchanged between the nodes 104-108 may include multicarrier symbols that each includes a plurality of tones or sub-channels. Each of the tones within a multicarrier symbol may have data bits modulated thereon that are intended for delivery from one of the nodes 104-108 to another. In an implementation, the transmitter 202 is arranged to modulate the data bits onto the tones and transmit the signals including the tones via the medium 102.

If included, the encoder 210 is arranged to receive data (e.g., from a user device) for communication to a receiving device coupled to the transceiver 116 via a wireless or wire line medium 102. More specifically, the encoder 210 is arranged to translate incoming data bit streams into in-phase and quadrature components for the plurality of tones. The encoder 210 may be arranged to output a number of symbol sequences that are equal to the number of tones available to the system 100.

If included, the modulator 212 is arranged to receive symbol sequences (e.g., from the encoder 210) to produce a modulated signal in the form of a discrete multi-tone signal. The modulator may pass the modulated signal to the filter 214 (if the filter is included) to undergo various filtering. In one implementation, the filtered signal is passed to the interface 216 for communication over the medium 102 to a receiving device. For example, the interface 216 may facilitate communication of the modulated signal to a network resource such as an automation control center, a surveillance hub, and the like.

In various implementations, the transceiver 116 may also include a receiver 204 that is capable of receiving modulated multi-tone signals communicated over the medium 102 from a transmitting device. As shown in FIG. 2, an example receiver 204 may include an interface 218, a filter 220, a demodulator 222, and a decoder 224. In alternate implementations, a receiver 204 may include fewer components, alternate components, or additional components and remain within the scope of the disclosure.

In one implementation, signals received by the receiver 204 may be passed to the filter 220 via the interface 218. The interface 218 may facilitate communication with a network resource, for example. After received signals undergo filtering by way of the filter 220 (if included), the filtered signals may be demodulated by the demodulator 222. The demodulated signals may be passed to and processed by the decoder 224.

If included, the decoder 224 produces data bit streams for consumption by a computing device, or the like. Effectively, the demodulator 222 and the decoder 224 perform the opposite functions of the modulator 212 and the encoder 210, respectively.

In various implementations, one or more of the controller 206, encoder 210, decoder 224, modulator 212, demodulator 222, interface 216 and/or 218, filter 214 and/or 220, as well as other components, may be implemented in hardware, firmware, software, or the like, or in combinations thereof.

Exemplary implementations discussed herein may have various components collocated; however, it is to be appreciated that the various components of the system 100 may be located at distant portions of a distributed network, such as a communications network and/or the Internet, or within a dedicated secure, unsecured and/or encrypted arrangement. Thus, it should be appreciated that the components of the system 100 may be combined into one or more apparatuses, such as a modem, or collocated on a particular node of a distributed network, such as a telecommunications network. Moreover, it should be understood that the components of the described system 100 may be arranged at any location within a distributed network without affecting the operation of the system 100. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system 100 may be distributed between a modem and an associated computing device.

Example Operations

Successful communications in communication networks (e.g., ITU-T G.9960/G.9961, IEEE 1901 FFT, IEEE 1901 Wavelet, etc.) using a communication medium (such as medium 102, for example) generally requires the detection, for example by a node 104-108 or a neighbor node, of communicated packets of information. However, it is also advantageous for nodes to enable a reduced power consumption state during periods of inactivity. Such reduced power consumption states may generally include a sleep state (i.e., transmit and receive disabled), idle state (i.e., node is listening but not processing frames in the system 100), and a limited sleep state (i.e., node is listening and processing frames, but not transmitting). An embodiment according to one implementation provides an efficient communication that enables nodes in a reduced power consumption state to resume a regular power state (e.g., fully operational) or otherwise another power state (e.g., semi-operational) after processing the communication.

Figure 3:
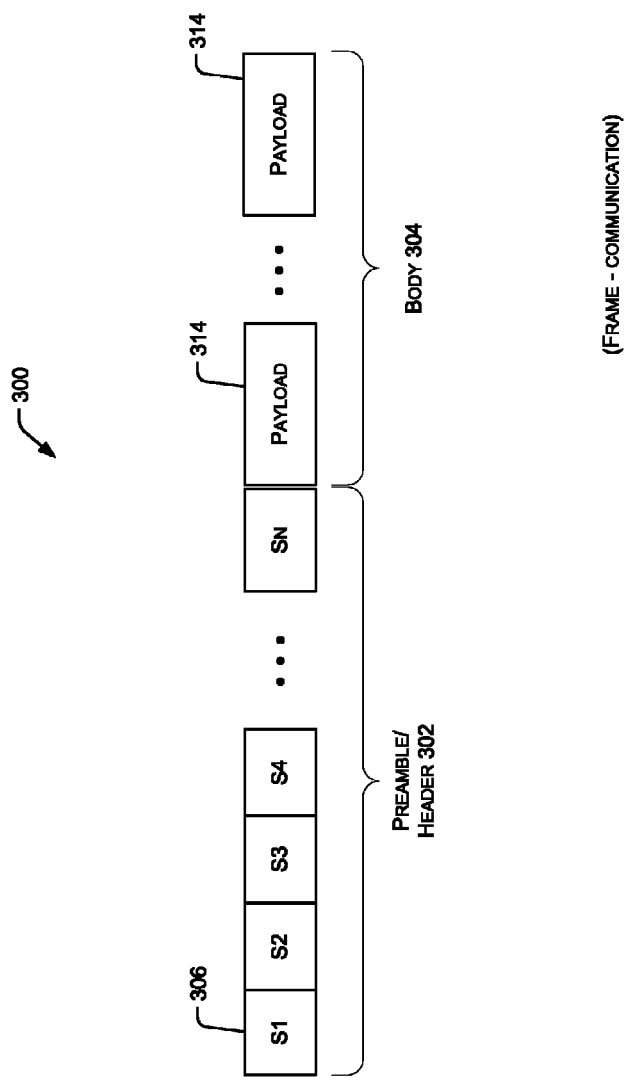
FIG. 3 is a schematic of an example communication block, according to an implementation.

FIG. 3 is a schematic of an example communication 300, according to an implementation. In the implementation, a node 104-108 or a neighbor node or network may periodically transmit the communication 300, to inform one or more other nodes or networks, among other things, that a power state is to be achieved such that the one or more node is able to receive communications in the system 100. That is, the communication 300 may be characterized as a wakeup communication, wakeup frame, or wakeup packet. For example, the controller 206 at a node 104-108 may execute instructions stored in a memory 208 at the node 104-108 to generate and/or transmit the communication 300 via the medium 102. In one implementation, the communication 300 is a MAP physical layer (PHY) frame communication. Similarly, the controller 206 at a node 104-108 may execute instructions stored in a memory 208 at the node 104-108 to receive and/or decode the communication 300 transmitted on the medium 102.

In one implementation, as shown in FIG. 3, the communication 300 includes a preamble/header portion 302 and a body portion 304. Although the preamble/header portion 302 is shown as being contiguous, it is also contemplated that the preamble and header may be two separate and distinct elements of the communication 300. The preamble/header portion 302 serves at least to alert all nodes to receive the communication 300 that the communication 300 is arriving on the medium 102. The preamble/header portion 302 may include a known sequence of 1's and 0's that allows time for one or more of the nodes 104-108 to detect the communication 300 and enter a state to receive data. The preamble/header portion 302 may also convey the length (in μsec) of the body portion 304, or the length of one or more individual payload sections 314 of the body portion 304. Furthermore, the preamble/header portion 302 may include the Frame Control Header (FCH). The FCH may include frame configuration information, such as the usable sub-channels, the modulation and coding scheme, and the MAP message length for the current frame, and for subsequent frame generated and communicated on communication network medium 102.

As illustrated in FIG. 3, the preamble/header portion 302 may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion 304, and another one or more of the plurality of the S1, S2, S3, S4 . . . Sn symbols may be used to convey supplemental information.

In one implementation, the supplemental information may include predetermined FCH instructions. The predetermined FCH instructions indicate to a node 104-108 that it is to generate frames for communication to include a predetermined FCH. More specifically, a node 104-108 is to generate frames that include the predetermined FCH, and all nodes the predetermined FCH instructions are to generate frames with the predetermined FCH.

In one implementation, the preamble/header portion 302 includes minimal information, such that nodes are simply able to detect the communication 300 in the system 100. For example, such minimal information may be a series of symbols that enable nodes to detect the presence of the communication 300 on the medium 102. At least one of the payloads 314, or only one payload 314, may include wakeup information for a node or nodes in a reduced power state (e.g., idle mode). Such a payload 314 that includes wakeup information may be referred to wakeup section 314. The wakeup section 314 may include a wakeup waveform. This wakeup waveform may be distinguishable from the preamble/header portion 302. For example, in one implementation, the wakeup waveform of the wakeup section 314 is orthogonal or pseudo-orthogonal to the preamble/header portion 302. In another implementation, the wakeup waveform of the wakeup section 314 is defined by one or more associated symbols that comprise a unique data pattern that one or more nodes recognize as being a wakeup waveform. In one implementation, the wakeup section 314 also includes one or more node identifications (node IDs) that are linked to one or more nodes associated with the in the system 100. Inclusion of the one or more node IDs enable nodes in the system 100 to determine if they should transition from an idle mode to another power mode.

The communication 300, as well as other communications described herein, may be received by the transceiver 116 of one or more of the nodes 104-108. That is, from time-to-time, one or more of the nodes 104-108 detects the presence of the communication 300, aided by the preamble/header 302, on the medium 102. The one or more nodes 104-108 may be in a reduced power state. Upon detecting the communication 300, the one or more nodes 104-108 evaluate the communication 300 to determine if a wakeup waveform is included in a wakeup section 314. If a wakeup waveform is detected, the one or more nodes 104-108 enables a node ID detector, which may be associated with the transceiver 116. The node ID detector, for example, may be part of the interface 218. If the node ID detector determines that an associated one or more nodes' 104-108 node ID is included in the wakeup section 314, the one or more node 104-108 transitions to another power state (e.g., full power state). In another implementation, the wakeup waveform is unique, such that only particular nodes 104-108 are able to observe the unique wakeup waveform. The unique wakeup waveform is sufficient to trigger a node 104-108 to transition to another power state. Unique wakeup waveforms may be pseudo random binary sequences (PRBS) modulated on one or more symbols, unique one or more pilot signals, and such.

Figure 4:
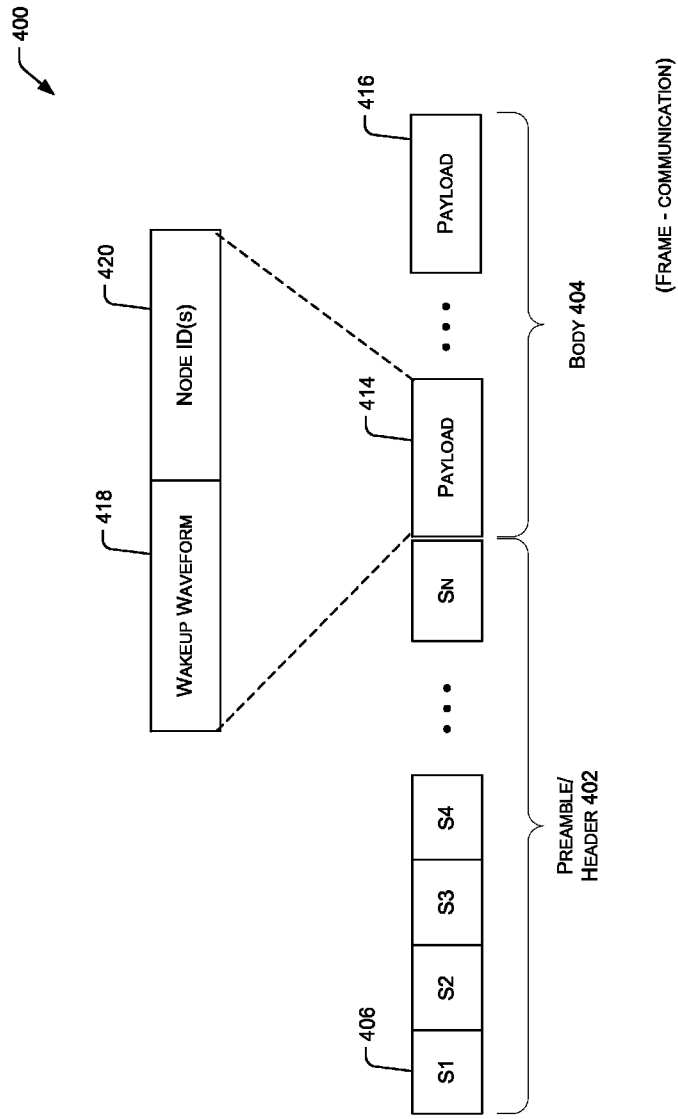
FIG. 4 is a schematic of an example communication block, according to an implementation.

FIG. 4 is a schematic of an example communication 400, according to an implementation. In one implementation, the communication 400 includes a preamble/header portion 402 and a body portion 404. Although the preamble/header portion 402 is shown as being contiguous, it is also contemplated that the preamble and header may be two separate and distinct elements of the communication 400. The preamble/header portion 402 serves at least to alert all nodes 104-108 to receive the communication 400 that the communication 400 is arriving on the medium 102. The preamble/header portion 402 may include a known sequence of 1's and 0's that allows time for the nodes to detect the communication 400 and enter a state to receive data. The preamble/header portion 402 may also convey the length (in μsec) of the body portion 404, or the length individual payload sections 414 and 416 of the body portion 404.

As illustrated in FIG. 4, the preamble/header portion 402 may be defined by S1, S2, S3, S4 . . . Sn symbols. A plurality of the S1, S2, S3, S4 . . . Sn symbols may be used for packet detection, timing estimation and frame synchronization (e.g., FCH related information), another one or more of the plurality of the S1, S2, S3, S4 . . . Sn symbols may be used to convey the length of the body portion 404, and another one or more of the plurality of the S1, S2, S3, S4 . . . Sn symbols may be used to convey supplemental information.

In one implementation, the preamble/header portion 402 includes minimal information, such that nodes are simply able to detect the communication 400 in the system 100. For example, such minimal information may be a series of symbols that enable nodes to detect the presence of the communication 400 on the medium 102. The payload 414 includes a wakeup waveform 418, and may also include one or more node IDs 420. The wakeup waveform 418 may be detected by a node or nodes in a reduced power state (e.g., idle mode). This wakeup waveform 418 may be distinguishable from the preamble/header portion 402. For example, in one implementation, the wakeup waveform 418 is orthogonal or pseudo-orthogonal to the preamble/header portion 402. In another implementation, the wakeup waveform 418 is defined by one or more associated symbols that comprise a unique data pattern that one or more nodes recognize as being a wakeup waveform. In one implementation, payload 414 also includes the node IDs 420 that are linked to one or more nodes associated with the in the system 100. Inclusion of the node IDs 420 enable nodes in the system 100 to determine if they should transition from an idle mode to another power mode.

The communication 400, as well as other communications described herein, may be received by the transceiver 116 of one or more of the nodes 104-108. That is, from time-to-time, one or more of the nodes 104-108 detects the presence of the communication 400, aided by the preamble/header 402, on the medium 102. The one or more nodes 104-108 may be in a reduced power state. Upon detecting the communication 400, the one or more nodes 104-108 evaluate the communication 400 to determine if the wakeup waveform 418 is included in the payload 414. If a wakeup waveform 418 is detected, the one or more nodes 104-108 enables a node ID detector, which may be associated with the transceiver 116. The node ID detector, for example, may be part of the interface 218. If the node ID detector determines that an associated one or more nodes' 104-108 node ID is included the node IDs 420, the one or more node 104-108 transitions to another power state (e.g., full power state). In another implementation, the wakeup waveform 418 is unique, such that only particular nodes 104-108 are able to observe the unique wakeup waveform 418. The unique wakeup waveform 418 is sufficient to trigger a node 104-108 to transition to another power state. That is, use a unique wakeup waveform 418 makes the use node IDs 420 unnecessary. Nonetheless, a node 104-108 triggered to another power state will proceed to demodulate the payload 416, where other nodes 104-108 will ignore the remainder of the communication 400 (e.g., the payload 416).

Figure 5:
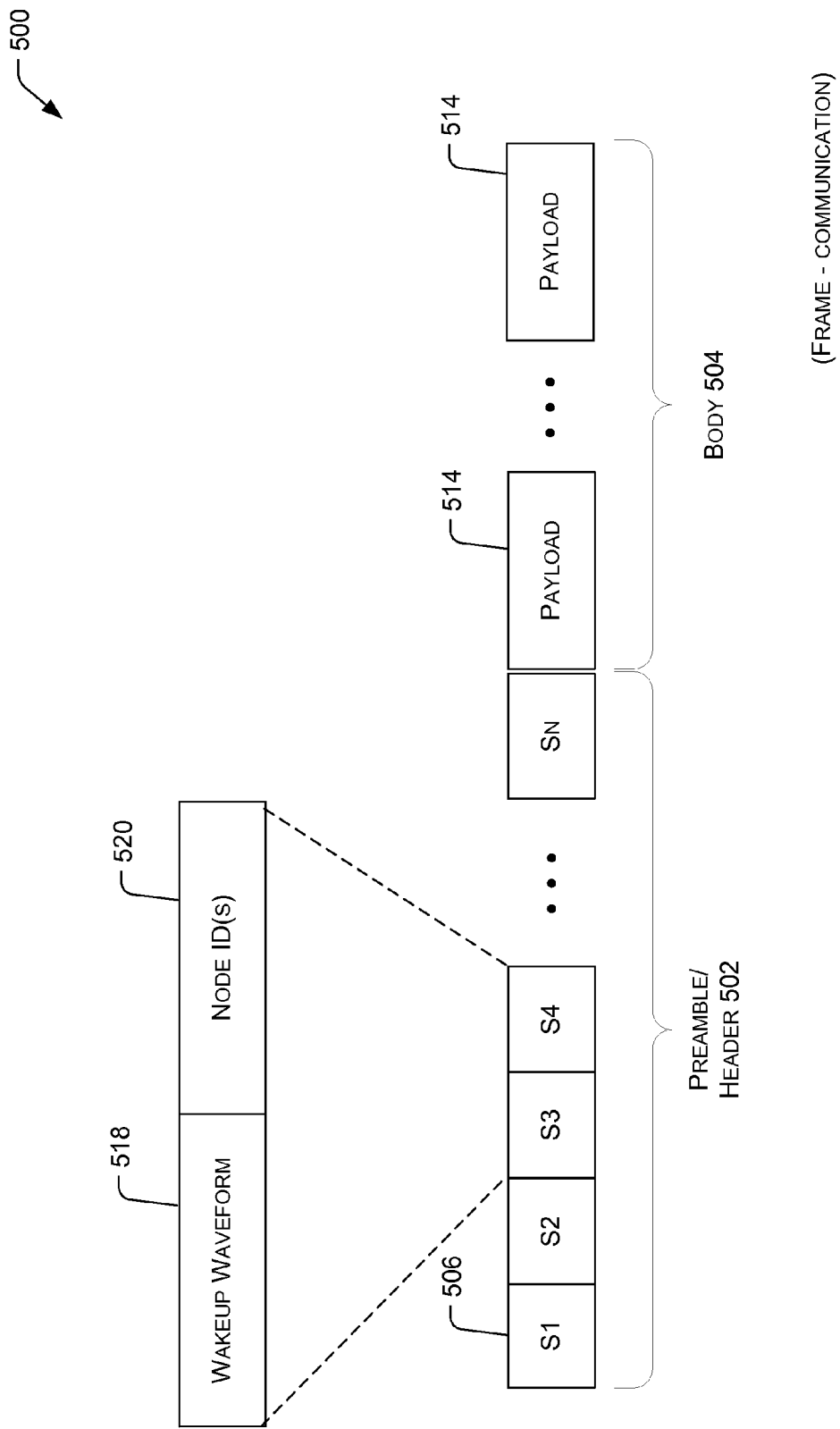
FIG. 5 is a schematic of an example communication block, according to an implementation.

FIG. 5 is a schematic of an example communication 500, according to an implementation. In one implementation, the communication 500 includes a preamble/header portion 502 and a body portion 504. Although the preamble/header portion 502 is shown as being contiguous, it is also contemplated that the preamble and header may be two separate and distinct elements of the communication 500. The preamble/header portion 502 serves at least to alert all nodes 104-108 to receive the communication 500 that the communication 500 is arriving on the medium 102. The preamble/header portion 502 may include a known sequence of 1's and 0's that allows time for the nodes to detect the communication 500 and enter a state to receive data. The preamble/header portion 502 may also convey the length (in µsec) of the body portion 504, or the length individual payload sections 514 of the body portion 504.

As illustrated in FIG. 5, the preamble/header portion 502 may be defined by S1, S2, S3, S4 . . . Sn symbols. A plurality of the S1, S2, S3, S4 . . . Sn symbols may be used for packet detection, timing estimation and frame synchronization (e.g., FCH related information), another one or more of the plurality of the S1, S2, S3, S4 . . . Sn symbols may be used to convey the length of the body portion 504, and another one or more of the plurality of the S1, S2, S3, S4 . . . Sn symbols may be used to convey supplemental information.

In one implementation, the preamble/header portion 502 includes minimal information, such that nodes are simply able to detect the communication 500 in the system 100. For example, such minimal information may be a series of symbols that enable nodes to detect the presence of the communication 500 on the medium 102. Furthermore, in this implementation, the preamble/header portion 502 includes a wakeup waveform 518, and may also include one or more node IDs 520. The wakeup waveform 518 may be detected by a node or nodes in a reduced power state (e.g., idle mode). This wakeup waveform 518 may be distinguishable from other parts of the preamble/header portion 502. For example, in one implementation, the wakeup waveform 518 is orthogonal or pseudo-orthogonal to other portions of the preamble/header portion 502. In another implementation, the wakeup waveform 518 is defined by one or more associated symbols that comprise a unique data pattern that one or more nodes recognize as being a wakeup waveform. In one implementation, the preamble/header portion 502 also includes the node IDs 520 that are linked to one or more nodes associated with the in the system 100. Inclusion of the node IDs 520 enable nodes in the system 100 to determine if they should transition from an idle mode to another power mode.

The communication 500, as well as other communications described herein, may be received by the transceiver 116 of one or more of the nodes 104-108. That is, from time-to-time, one or more of the nodes 104-108 detects the presence of the communication 500, aided by the preamble/header 502, on the medium 102. The one or more nodes 104-108 may be in a reduced power state. Upon detecting the communication 500, the one or more nodes 104-108 evaluate the communication 500 to determine if the wakeup waveform 418 is included therein. If a wakeup waveform 518 is detected, the one or more nodes 104-108 enables a node ID detector, which may be associated with the transceiver 116. The node ID detector, for example, may be part of the interface 218. If the node ID detector determines that an associated one or more nodes' 104-108 node ID is included the node IDs 420, the one or more node 104-108 transitions to another power state (e.g., full power state). In another implementation, the wakeup waveform 518 is unique, such that only particular nodes 104-108 are able to observe the unique wakeup waveform 518. The unique wakeup waveform 518 is sufficient to trigger a node 104-108 to transition to another power state. That is, use a unique wakeup waveform 518 makes the use node IDs 520 unnecessary. Nonetheless, a node 104-108 triggered to another power state will proceed to demodulate one or more payloads 514, where other nodes 104-108 will ignore the remainder of the communication 500 (e.g., the payload 514).

In another implementation, a node 104-108 informs controller node 106 before it enters a reduced power consumption state. The controller node 106 may propagate to other nodes 104-108 that the node 104-108 will be in a reduced power consumption state. The controller node 106 may also propagate the unique wakeup waveform that is associated with the node 104-108 or group of nodes 104-108 to the other nodes 104-108. Therefore, one or more nodes 104-108 may maintain a list nodes in reduced power consumption state and their associated unique wakeup waveform(s). Nodes 104-108 maintaining such information may (1) avoid sending communications to nodes 104-108 in reduced power consumption state, (2) request the controller node 106 to cause an idle node to transition to another power state, and/or (3) communicate a wakeup communication to one or more nodes 104-108 in a reduced power consumption state.

In alternate implementations, one or more of the above techniques may be employed concurrently, or another technique may be used to accomplish the same or similar results. The implementations herein are described in terms of exemplary embodiments. However, it should be appreciated that individual aspects of the implantations may be separately claimed and one or more of the features of the various embodiments may be combined.

Representative Processes

Figure 6:
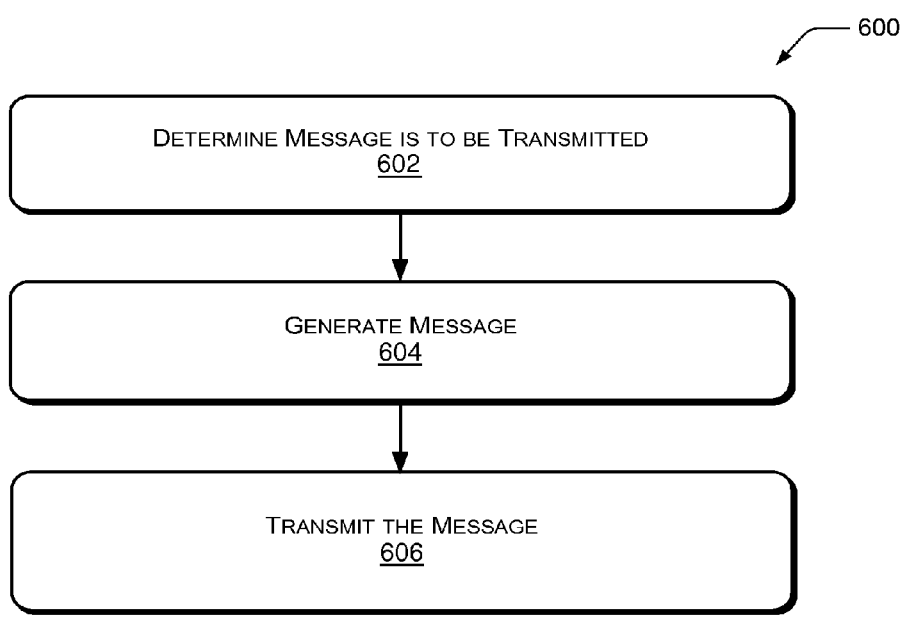
FIG. 6 illustrates a representative process for generating a communication at a node that includes wakeup information.

FIG. 6 illustrates a representative process 600 for generating a communication (e.g., communication 300, 400, and/or 500) at a node (e.g., nodes 104-108) that includes a wakeup waveform and other associated information. The described techniques may also be used with domains, networks, and the like. An example process 600 may be performed on a system 100, for example, where a common network communication medium 102 is shared. However, other communication media may also be used with the representative process 600. In one example, the communication network medium 102 comprises a single communication channel and at least two nodes (such as one or more of the nodes 104-108) representing discrete homogeneous networks are communicatively coupled to the single communication channel. The process 600 is described with reference to FIGS. 1-5.

At block 602, a node (such as nodes 104-108) determines that a message is to be transmitted. The determination to transmit a message may be based on a plurality of factors. Typical factors may include facilitating discovery, initiating network maintenance, providing route discovery, conveying information, etc. In one example, the message may be a communication (e.g., communication 300, 400, and/or 500). In one implementation, the message is a mobile application protocol (MAP) physical layer (PHY) frame.

At block 604, the node generates the message. The message includes a preamble/header portion and a body portion. The preamble/header portion serves at least to alert all nodes to receive the message that the message is arriving on the medium. The preamble/header portion may include a known sequence of 1's and 0's that allows time for the nodes to detect the message and enter a state to receive data. The preamble/header portion may also convey the length (in μsec) of the body portion, or the length individual payload sections of the body portion. In one implementation, the predetermined header information includes an instruction that all frames generated by the receiving node are to include a FCH generated in conformity with the predetermined header information. The preamble/header portion includes minimal information, such that nodes are simply able to detect the message in the system. For example, such minimal information may be a series of symbols that enable nodes to detect the presence of the message on the medium. The payload includes a wakeup waveform, and may also include one or more node IDs. The wakeup waveform may be detected by a node or nodes in a reduced power state (e.g., idle mode). This wakeup waveform may be distinguishable from the preamble/header portion. For example, in one implementation, the wakeup waveform is orthogonal or pseudo-orthogonal to the preamble/header portion. In another implementation, the wakeup waveform is defined by one or more associated symbols that comprise a unique data pattern that one or more nodes recognize as being a wakeup waveform. In one implementation, payload also includes the node IDs that are linked to one or more nodes associated with the in the system. Inclusion of the node IDs enable nodes in the system to determine if they should transition from an idle mode to another power mode.

At block 606, the message is transmitted by the node on the communication medium. In one implementation, the message is transmitted on the communication medium for reception by one or more nodes that are associated with the communication medium. In another implementation, the message is transmitted to one or more particular nodes.

The order in which the process 600 is described is not intended to be construed as a limitation, and any number of the described process blocks can be combined in any order to implement the process, or alternate processes. Additionally, individual blocks may be deleted from the processes without departing from the spirit and scope of the subject matter described herein. Furthermore, the process can be implemented in any suitable hardware, software, firmware, or a combination thereof, without departing from the scope of the subject matter described herein.

In alternate implementations, other techniques may be included in the process 600 in various combinations, and remain within the scope of the disclosure.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium (such as memory 208), executed on programmed general-purpose computer with the cooperation of a controller (such as controller 206) and memory 208, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. A system, comprising:
a communication network medium; and
at least one node coupled to the medium, the at least one node arranged to communicate, at least in part via the medium, a frame that includes a portion enabling one or more nodes to detect the frame and another portion that includes wakeup information,
wherein the portion and the another portion are both provided in a preamble and header portion of the frame, wherein the wakeup information includes a wakeup waveform,
wherein the wakeup waveform is defined by one or more associated symbols that comprise a unique data pattern that one or more nodes recognize as being a wakeup waveform, and one or more node identifications, wherein the unique data pattern and the one or more node identifications are separate, distinct groups of one or more associated symbols, and
wherein the wakeup waveform includes information that is orthogonal or pseudo-orthogonal to information of the portion enabling the one or more nodes to detect the frame, and wherein the wakeup waveform causes a transitioning from a first power state to a second power state at a receiving node,
the frame further including a body portion.

2. The system of claim 1, wherein the frame further includes a payload for delivery to one or more nodes linked to the one or more node identifications.

3. The system of claim 1, wherein the wakeup information is a unique wakeup waveform that is linked to only one node or a predefined set of nodes of a plurality of nodes.

4. The system of claim 1, wherein the body portion corresponds to a payload portion.

5. The system of claim 1, wherein the frame consists only of the preamble and header portion and the body portion.

6. The system of claim 1, wherein the frame is a mobile applications protocol (MAP) physical layer (PHY) frame communication.

7. A node, comprising:
a controller; and
a storage memory coupled to the controller and including instructions to generate at least one communication for communication on a communication network medium when executed by the controller, the at least one communication to include:
a first portion enabling one or more nodes to detect the at least one communication, and
a second portion including wakeup information, the wakeup information to indicate a predefined set of nodes of a plurality of nodes associated with the communication network medium is to transition from a first power state to a second power state,
wherein the second portion is provided immediately following the first portion,
wherein the wakeup information includes a wakeup waveform, wherein the wakeup waveform is defined by one or more associated symbols that comprise a unique data pattern that one or more nodes recognize as being a wakeup waveform, and one or more node identifications, wherein the unique data pattern and the one or more node identifications are separate, distinct groups of one or more associated symbols,
wherein the wakeup waveform includes information that is orthogonal or pseudo-orthogonal to information of the portion enabling the one or more nodes to detect the frame and wherein the wakeup waveform causes a transitioning from a first power state to a second power state at a receiving node.

8. The node of claim 7, wherein the first power state is a reduced power consumption state and the second power state is a state in which the one or more nodes consume more power than in the reduced power consumption state.

9. The node of claim 7, wherein the at least one communication consists only of the first and second portions.

10. The node of claim 7, wherein the at least one communication comprises at least a preamble and header portion and a payload portion, at least part of the at least a preamble and header portion to carry the first portion enabling the one or more nodes to detect the at least one communication and the payload portion to carry the wakeup information.

11. A method, comprising:
receiving, at a node, a frame including a first portion enabling one or more nodes to detect the frame and a second portion including wakeup information, the wakeup information to indicate that a predefined set of nodes of a plurality of nodes is to transition from a first power state to a second power state, the wakeup information comprising a wakeup waveform, wherein the wakeup waveform is defined by one or more associated symbols that comprise a unique data pattern that one or more nodes recognize as being a wakeup waveform, and one or more node identifications, wherein the unique data pattern and the one or more node identifications are separate, distinct groups of one or more associated symbols, wherein the wakeup waveform includes information that is orthogonal or pseudo-orthogonal to information of the first portion enabling the one or more nodes to detect the frame, and wherein the second portion is received immediately following the first portion; and
transitioning the first power state to the second power state at the node.

12. The method of claim 11, wherein the first power state is a reduced power consumption state and the second power state is a state in which the one or more nodes consume more power than in the reduced power consumption state.

13. The method of claim 11, wherein the frame comprises at least a preamble and header portion and a payload portion, at least part of the at least a preamble and header portion to carry the first portion enabling the one or more nodes to detect the at least one communication and the payload portion to carry the wakeup information.

* * * * *